Figure 1:
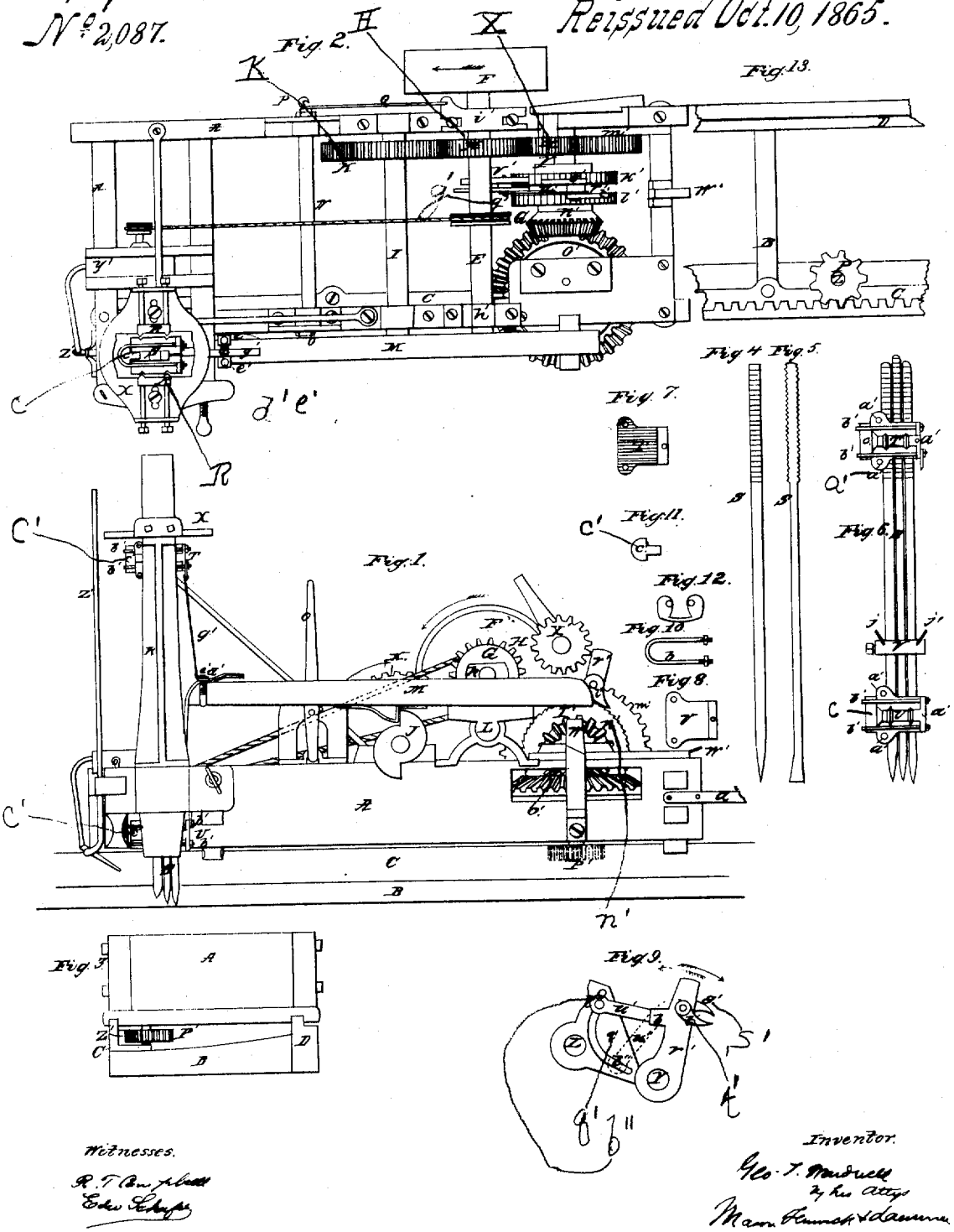

G. J. Wardwell

2 Sheets. Sheet 1.

Stone-Channeling Machine.

47

No. 2,087.

Reissued Oct. 10, 1865.

Witnesses.

R. T. Burnett

Edw. Schupe

Inventor.

Geo. J. Wardwell by his attys

Mann, Hammond & Lawrence

G. J. Wardwell,
2 Sheets, Sheet 2.
Stone-Channeling Machine
No. 2,087.
Reissued Oct. 10, 1865.
Fig. 2.
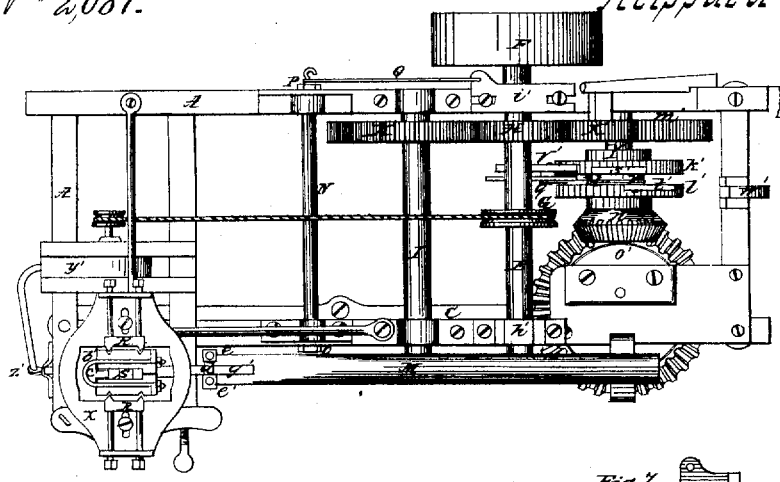
Fig. 13.
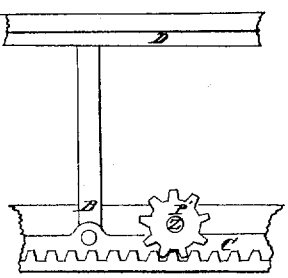
Fig. 4. Fig. 5.
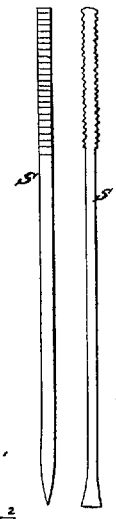
Fig. 7.
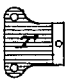
Fig. 6.
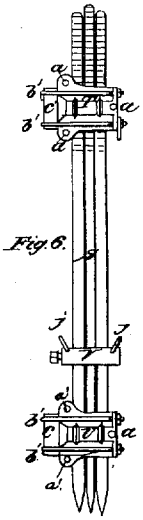
Fig. 1.
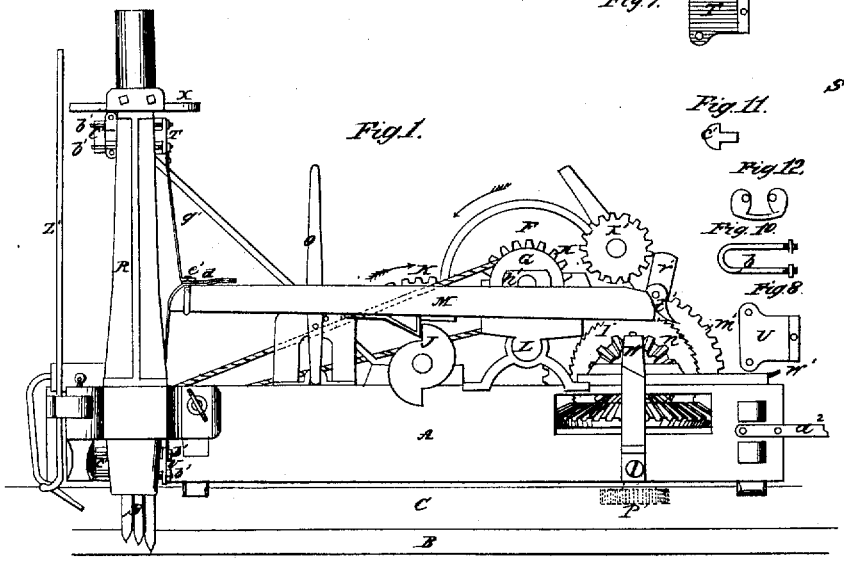
Fig. 11.
Fig. 12.
Fig. 10.
Fig. 8.
Fig. 3.
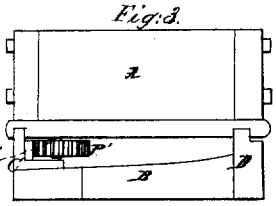
Fig. 9.
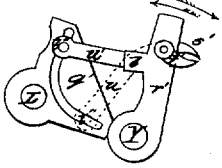
Witnesses
H. S. Campbell
E. Schafer
Inventor
Geo. J. Wardwell
by his attys
Mann, Fessenden & Lawrence
AM. PHOTO-LITHO. CO. N.Y. (OSBORNE'S PROCESS)

UNITED STATES PATENT OFFICE

GEORGE J. WARDWELL, OF RUTLAND, VERMONT, ASSIGNOR TO THE STEAM STONE CUTTING COMPANY OF NEW YORK.

IMPROVED STONE-CUTTING MACHINE.

Specification forming part of Letters Patent No. 40,584, dated November 10, 1863; Reissue No. 2,087, dated October 10, 1865.

DIVISION NO. 1.

*To all whom it may concern:*

Be it known that I, GEORGE J. WARDWELL, of Rutland, in the county of Rutland and State of Vermont, having invented a new and Improved Stone-Cutting Machine; and I do hereby declare that the following is a full, clear, and exact description of that part of my invention which relates to Division No. 1, reference being had to the accompanying drawings, making a part of this specification, in which—

Figure 1 is an elevation of one side of the machine. Fig. 2 is a plan view of the machine. Fig. 3 is an elevation of the rear end of the frame of the machine, mounted upon a track. Figs. 4 and 5 show the form of the cutters. Fig. 6 shows the mode of uniting the cutters together in a gang by means of clamps. Figs. 7, 8, 10, 11, 12 are detail views of parts of the head and foot clamps. Fig. 9 is a side view of the slotted feed-plate and its attachments. Fig. 13 is a top view of a portion of the track with its rack and the pinion feed-wheel engaging therewith.

Similar letters of reference indicate corresponding parts in the several figures.

The object of my invention is to cut "trenches" or vertical channels in stone quarries by machinery, with the view of removing large and valuable stones whose vertical sides are smooth.

The nature of my invention consists chiefly in arranging a series or a gang of upright cutters in such manner that they are susceptible of receiving a rapid vertical motion outside of the frame upon which they are supported, which latter is moved upon and guided by means of a track, so that the cutters will form vertical trenches or narrow channels in the quarry of any desirable length, according to the size of the stones which it is desired to remove, as will be hereinafter described.

The invention also consists in contrivances for supporting, guiding, and moving said gang of cutters, and for adjusting their cutting-edges as they are worn away; also, in providing for clearing the channel, as it is formed, of dust, by the employment of a blast of air, which is conducted to the proper point by means of a tube; also, in a guide and supporting-frame, which will admit of the gang of cutters being reversed, as the machine is moved backward and forward, for cutting in both the forward and backward movements, all as will be hereinafter described.

To enable others skilled in the art to understand my invention, I will describe its construction and operation.

In the accompanying drawings, A represents the frame of the machine. B is the bed-frame, to which the rails or track should be secured for the machine to move upon. C is the feed-rail, which is furnished with a toothed rack on the inside, as shown in Fig. 13. D is the off-rail. E is the main driving-shaft, one end of which is hung in a pivot box or bearing, $h'$. Said shaft carries a pulley, G, and pinion H on inside of the frame A, as shown in Fig. 2. I is the cam-shaft, which is situated forward of and lower than the main shaft, and which carries a cam, J, on outside of the frame A, and a gear-wheel, K, on the inside of this frame, which wheel receives motion from the main shaft E by means of the pinion H. N is a smaller shaft, which is situated forward of the cam-shaft I. To the ends of this shaft N levers O and P are attached, the former of which is on that side of the frame A upon which the cutters are arranged and the latter is connected with the sliding bearing $i'$ of the main shaft E by the rod Q. The object of these levers and connecting-rod is to enable the attendant to throw the main shaft E into and out of gear with the cam-shaft.

R R are two standards, both of which are furnished with two parallel V-shaped guides on their inner surfaces, on which the guide-blocks T and U, with the gang of cutters or drills S move. These standards are situated near the forward end of the frame A, one of which is permanently attached to the outside of this frame, while the other is made adjustable, and after removing the caps or collar X this latter standard can be swung from its position for putting in or taking out a gang of cutters and for making any other changes with cutters that may be required in operating the machine. The top ends of each gang of cutters have their sides corrugated or serrated crosswise, as represented in Figs. 4, 5, and 6. The guide-blocks T at the head of the cutters have a portion of their inner surfaces corrugated to correspond with the corrugations on the cutter-stems. (See Fig. 7.) The outsides of said guide-blocks are furnished with grooves, that receive the V-shaped guides on the standards.

A guide-block is placed on each side of the cutter-stems and bolted together by means of three bolts, *a'*. They are then firmly compressed edgewise by means of clamp-rods or bolts *b'* and packing-blocks *c'*. The foot guide-blocks U have no corrugations on their inner surfaces, but in other respects are like the head-blocks, and are bolted and clamped in a similar manner, as represented in Fig. 6.

The object of the corrugations in the sides of the cutter-stems and the corresponding ones on the inner surfaces of the head guide-blocks is to prevent the cutters from changing their relative position with respect to each other in the gang when these cutters have been properly adjusted and clamped together. At the same time it does not limit any one cutter to a particular place in the gang, as each can be turned round, transposed, or made shorter by sharpening and repairs, thereby allowing drills of different lengths to be used in any required place in the gang.

The number of cutters or drills is not necessarily limited to three, as shown in the drawings, as any other number may be used, according to the size and capacity of the machine. The cutters are intended to be so arranged in relation to each other that the cutting-point of each shall be lower than the one preceding it. The foot guide-blocks are intended to be used as near the lower ends of the standards as may be found practicable, and they are to be loosened and secured higher as the cutters work deeper into the trench or channel in the stone.

V is a clasp, that embraces the cutter-stocks and that occupies a place above the foot guide-blocks and below the end of the vibrating beam M. This clasp is secured in position by a set-screw or bolt, as shown in Fig. 6, and it is furnished with a ring, *j*, at each end, and is connected to the forward end of the beam M by a strap, *f'*, which passes over the end of this beam and is secured thereto by means of a plate, *d'*, and bolts *e'*.

L is a rock-shaft, to which is attached in any suitable manner the beam M on the outside of the frame A.

W is a rubber or metallic spring, situated under the rear end of the beam M and back of the rock-shaft L, for the purpose of giving additional impetus to the drills or cutters in their descending strokes.

*g'* is a strap, one end of which is attached to a loop, Fig. 12, on the head guide-blocks, and the other end passes under the plate *d'* and beam M, and is secured with the strap *f'* for raising the cutters. The object of the strap *g'* is to communicate the force of the rubber or metal spring W to the cutters.

Y is the feed-shaft, which is situated near the rear end of the frame A, as shown in Fig. 2, carrying the ratchet-wheels *k'* and *l'*, gear-wheel *m'*, and bevel-pinion *n'*.

Z is a vertical shaft, carrying the bevel gear-wheel *o'* at its top end and the pinion P' at its lower end. This pinion P' works in the teeth of the rack C on the inside of the rail or track, as shown in Figs. 3 and 13.

*q'* is a slotted plate, which is attached to the rock-shaft L, for giving motion to the ratchet-wheels, and is what I term a "double-acting feed-arm."

*r'* is a vibrating lever, the lower end working loosely on the feed-shaft Y, as shown in Fig. 9, between the two ratchet-wheels *k' l'*. The upper end of this lever is furnished with two fingers or pawls, *s'* and *t'*, each intended to work in the teeth of their respective ratchet-wheels, as occasion may require.

*u'* is a connecting-rod, one end of which is attached to a projection on the edge of the vibrating lever *r'* and the other end to a stud or bolt, *b''*, in the slot of the double-acting feed-arm *q'*, as shown in Fig. 9.

*v'* is a stay-finger or pawl, which is hung loosely on the rock shaft L, and which works in the teeth of the ratchet-wheel *k'*.

*w'* is a stay, ratchet, or dog, attached to the rear end of frame A, and is intended to work in the teeth of the ratchet-wheel *l'*. Each of said stay-fingers or dogs is used as occasion may require.

*x'* is a gear-wheel, which is attached to a lever on the back side of the frame A, as shown in Figs. 1 and 2, and is thrown into gear with the pinion H on main shaft E and gear-wheel *m'* on the feed-shaft Y when it is desirable to run the machine back without working the drills or cutters.

Y' is a revolving fan at the forward end of the machine, which is driven by pulley G on on the main shaft. Said fan is intended for blowing chips and dust from under the cutters.

*z'* is a rod in front of drills, with an eye formed in its lower end for receiving and supporting the nozzle of the wind-pipe and giving direction to the same. This rod *z'* can be raised or lowered as the depth of the trench may require.

The operation of the machine is as follows: The main shaft E is rotated by any suitable prime mover, applied so as to follow the machine in its forward and backward movements upon its track. The pinion H is moved into gear with the spur-wheel K on the cam-shaft I. The feed and stay fingers *s'* and *y'* are placed on the face of the ratchet-wheel *l'*. The main shaft E being revolved in the direction indicated by the arrow on the drum F, Fig. 2, the pinion H and spur-wheel K communicate motion to the cam-shaft I and cam J, which latter raises the beam M, together with the cutters S and their guide-blocks T U and clasp V. At the same time the spring W is compressed, the rock-shaft L, with the double-acting feed-arm $q'$, make a partial revolution, which vibrates or moves the lever $r'$, with its pawl or feed-fingers $s'$ $t'$. The end of feed-finger, $s'$, catching in the teeth of ratchet-wheel $l'$, causes the same, with the feed-shaft Y, vertical shaft Z, and pinion P′, to make a partial revolution, thereby moving the whole machine forward on the track or rails simultaneously with the raising of the cutters.

After the drills or cutters have been raised to their highest point they are immediately forced downward by the action of the spring W and their own gravity, thereby bringing the cutting-points in contact with the surface of the stone to be cut. As the drills or cutters rise the wind created by the revolving fan G′ will blow away any chips or dust from the channel or trench. These movements of the cutters are repeated until the machine has traveled the required distance, when the further movement can be stopped by moving the pinion H out of gear.

In order to adjust the machine for cutting backward the cap-plate X is removed, the outside standard, R, is swung from its position, the straps $g'$ and $f'$ are detached from the beam M, and the gang of cutters reversed, the straps, standard, and cap-plate are then properly adjusted, the feed and stay fingers are removed from the ratchet-wheel $k'$, and the feed and stay fingers $t'$ $w'$ are adjusted so as to work in the teeth of the ratchet-wheel $l'$, the stud or bolt $b''$ in the slot of the double-acting feed-plate $q'$ is loosened and moved to the lower end of said slot, as indicated in red lines, Fig. 9, which will reverse the movement of the vibrating arm or lever $r'$. The machine can now be moved again. The feed-finger $t'$, working in the teeth of the ratchet-wheel $l'$, causes the feed-shaft and also the vertical shaft and their gears $m'$ $n'$ $o'$ P′ to make a partial revolution and the machine to move, while the drills or cutters are being raised in an opposite direction to that above described.

From the above description of my improved stone-cutting machine it will be seen that the sides of the trenches or channels cut by the drills will be straight and smooth as a sawed surface. Hence there will be a great saving in stock, as compared with channels cut by hand-power, and also a saving in the subsequent labor of dressing the stone after it is removed from the quarry.

One of the advantages of my machine over others intended for cutting stone is the arrangement of the cutters so that they can be practically operated on the outside of the frame of the machine and track upon which it is moved; also the convenience of changing the cutters or drills by allowing the outside standard to swing from its position so as to obtain free access to the cutters for reversing them at the ends of the channel in the stone, for adapting the machine to cut in moving both backward and forward.

I do not claim, broadly, a stone-cutting machine which moves upon a track, but desire to confine that part of my invention set forth in the first clause of the claim to a machine which has its cutters arranged to work outside of the track upon which the machine is moved.

Having thus described my invention, what I claim as new, and desire to secure by Letters Patent, is—

1. A stone cutting or channeling machine, which is constructed to move upon a track and provided with reciprocating cutters which are supported in standards arranged on the outside of the frame and outside of the said track, substantially as described.

2. The combination of two or more cutters in gangs, connected together by means of head and foot clamps, which are adapted to slide freely between standard-guides R R, that are supported on one side of the frame of the machine, substantially as described.

3. Providing for reversing the removable cutters S by hinging the outside standard, R, so that it can be opened or closed at pleasure, substantially as described.

4. The combination of the vibrating beam M and reciprocating cutters S, connected in such manner that the said beam operates upon the cutters in its ascending stroke as well as in its descending stroke, substantially as described.

5. The combination of a spring, W, vibrating beam M, and reciprocating cutters S, substantially as described.

6. The serrated cutter-stems, in combination with the serrated head-clamp T, substantially in the manner described.

7. The application of packing-blocks $c'$ to the head and foot clasps, T U, substantially as described.

8. The standards R, arranged on the outside of a portable frame, A, substantially as and for the purposes specified.

GEO. J. WARDWELL.

Witnesses:
W. G. VEAZEY,
BEN K. CHASE.